(12) United States Patent
Kim et al.

(10) Patent No.: US 11,859,360 B2
(45) Date of Patent: Jan. 2, 2024

(54) TOOTHED CONVEYOR BELT TYPE OIL RECOVERY DEVICE

(71) Applicant: KOREA INSTITUTE OF SCIENCE AND TECHNOLOGY, Seoul (KR)

(72) Inventors: Seong-Jin Kim, Seoul (KR); Myoung-Woon Moon, Seoul (KR); Seo-Hyun Cho, Seoul (KR); Young-A Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 17/694,677

(22) Filed: Mar. 15, 2022

(65) Prior Publication Data

US 2022/0412033 A1 Dec. 29, 2022

(30) Foreign Application Priority Data

Jun. 25, 2021 (KR) .......................... 10-2021-0082836

(51) Int. Cl.
*E02B 15/10* (2006.01)
*E02B 15/04* (2006.01)
*B01D 17/02* (2006.01)

(52) U.S. Cl.
CPC ............ *E02B 15/104* (2013.01); *B01D 17/02* (2013.01); *E02B 15/045* (2013.01)

(58) Field of Classification Search
CPC ................. E02B 15/045; E02B 15/048; E02B 15/101–104; B01D 17/0214; B01D 17/02; B01D 17/0202; C02F 1/40; Y02A 20/204; B02C 4/30

USPC ... 210/170.05, 170.09, 170.1, 170.11, 242.3, 210/242.4, 747.5, 747.6, 776, 923, 924
See application file for complete search history.

(56) References Cited

U.S. PATENT DOCUMENTS

| | | | | |
|---|---|---|---|---|
| 3,338,414 A | * | 8/1967 | Lefke ................... | E02B 15/102 210/776 |
| 3,426,902 A | * | 2/1969 | Bauer ................... | E02B 15/103 210/776 |
| 3,623,609 A | * | 11/1971 | Ainlay ................... | E02B 15/104 210/242.3 |
| 3,670,896 A | * | 6/1972 | Hale, Jr. ............... | E02B 15/104 210/242.3 |

(Continued)

FOREIGN PATENT DOCUMENTS

KR 10-1411538 B1 7/2014

*Primary Examiner* — Joseph W Drodge
(74) *Attorney, Agent, or Firm* — CANTOR COLBURN LLP (57) ABSTRACT

The present disclosure is directed to providing a toothed conveyor belt type oil recovery device including: a recovery conveyor which is rotates in such a way that a continuous track rotates, the recovery conveyor having multiple teeth made of a hydrophilic material on an outer surface, the recovery conveyor having one side positioned in water in which oil is spilled to recover the oil while feeding the oil into a space between the adjacent teeth by the rotation; and a separation unit which holds an oil separating liquid, and is positioned on the other side of the recovery conveyor to separate the oil from the teeth while the oil separating liquid is fed into the space between the adjacent teeth by capillary suction when the teeth move on to the oil separating liquid on the other side of the recovery conveyor by the rotation of the recovery conveyor.

7 Claims, 11 Drawing Sheets

(56) References Cited

U.S. PATENT DOCUMENTS

| | | | | |
|---|---|---|---|---|
| 4,315,818 A | * | 2/1982 | Thomas | E02B 15/103 210/242.3 |
| 4,336,137 A | * | 6/1982 | Byers | E02B 15/104 210/242.3 |
| 5,019,253 A | * | 5/1991 | Byers | B02C 4/30 210/923 |
| 5,387,341 A | * | 2/1995 | Remy | E02B 15/102 210/242.3 |
| 7,410,577 B2 | * | 8/2008 | Broje | E02B 15/103 210/242.3 |
| 11,624,166 B2 | * | 4/2023 | Kim | B01D 17/045 210/170.1 |
| 2014/0124427 A1 | * | 5/2014 | Riedel | E02B 15/101 210/242.4 |
| 2022/0251793 A1 | * | 8/2022 | Kim | E02B 15/048 |

* cited by examiner

TOOTHED CONVEYOR BELT TYPE OIL RECOVERY DEVICE

CROSS-REFERENCE TO RELATED APPLICATION

This application claims priority to Korean Patent Application No. 10-2021-0082836, filed on Jun. 25, 2021, and all the benefits accruing therefrom under 35 § 119, the contents of which in its entirety are herein incorporated by reference.

BACKGROUND

1. Field

The present disclosure relates to an oil recovery device for recovering oil spilled in water, and more particularly, to a toothed conveyor belt type oil recovery device for recovering oil spilled in water by a recovery conveyor having teeth on an outer surface.

2. Description of the Related Art

Recently, oil spill accidents frequently occur in oceans or rivers by a variety of reasons, and when oil spill accidents occur in oceans or rivers, oil or Hazardous & Noxious Substance (HNS) on sea or river surfaces spreads out quickly, causing severe environmental pollution.

Accordingly, to prevent water pollution, above all else, it is the most important to prevent accidents of a variety of transportation means including ships moving across oceans or rivers, and when oil or HNS spill accidents occurred, it is important to remove the spilled oil or HNS quickly.

Meanwhile, in the event of oil spills, commonly used methods include a method which sprays emulsifiers onto water on which oil floats to settle out the oil to the bottom of seas or rivers, or a method which removes oil at shores using booms after pollutants spread to the shores.

However, the emulsifiers cause secondary pollution due to oil settled out on the bottom, and oil removal using the booms is used after pollutants have already spread out very seriously, so it is necessary to develop technology for effectively controlling oil spread and recovering oil immediately after oil spills.

To recover oil, oil skimmers may be used, but it is reported that oil skimmers collect more water than oil, and thus more water than oil is stored in oil storage, resulting in low oil recovery efficiency.

Meanwhile, another approach is an oil-water separation method for separating spilled oil from water by controlling surface energy such as surface hydrophilicity and hydrophobicity.

The oil-water separation method may be largely classified into a method which allows oil to pass and blocks water using a superhydrophobic filter having low surface energy, and a method which allows water to pass using a hydrophilic or superhydrophilic filter having high surface energy and prevents oil from passing by a membrane formed on the filter.

As mentioned above, to remove oil spilled in oceans or rivers, booms, emulsifiers and oil skimmers including oleophilic materials have low oil recovery performance, and accordingly it is necessary to develop equipment for water and oil separation including a hydrophilic material.

RELATED LITERATURES

Patent Literature

Korean Patent No. 10-1411538 (registered on Jun. 18, 2014)

SUMMARY

The present disclosure is designed in this background, and therefore the present disclosure is directed to providing a toothed conveyor belt type oil recovery device for separating oil recovered by teeth on one side of the recovery conveyor from the teeth by capillary suction on the other side of the recovery conveyor, thereby preventing oil debris from remaining on the surface of the recovery conveyor, and thus continuously performing the recovery work of oil spilled in water.

The present disclosure is further directed to providing a toothed conveyor belt type oil recovery device for completely separating oil recovered by the teeth from the teeth by capillary suction, thereby preventing oil that has not been separated from the recovery conveyor and remains on the recovery conveyor from returning to the water.

The object of the present disclosure is not limited thereto, and other objects not mentioned herein will be clearly understood by those skilled in the art from the following description.

To achieve the above-described object, an embodiment of the present disclosure provides a toothed conveyor belt type oil recovery device including: a recovery conveyor which is wound around a pulley on one side and a pulley on the other side spaced a predetermined distance apart from each other and rotates in such a way that a continuous track rotates, the recovery conveyor having multiple teeth made of a hydrophilic material on an outer surface, the recovery conveyor having one side positioned in water in which oil is spilled to recover the oil while feeding the oil into a space between the adjacent teeth by the rotation; and a separation unit which holds an oil separating liquid, and is positioned on the other side of the recovery conveyor to separate the oil from the teeth while the oil separating liquid is fed into the space between the adjacent teeth by capillary suction when the teeth move on to the oil separating liquid on the other side of the recovery conveyor by the rotation of the recovery conveyor.

Additionally, there is provided the toothed conveyor belt type oil recovery device wherein the teeth have a nanostructure on a surface thereof, the nanostructure of at least one type selected from the group consisting of a nano-hair, a nanofiber, a nano-pillar, a nano-rod and a nano-wire.

Additionally, there is provided the toothed conveyor belt type oil recovery device wherein the teeth are made of a porous material which absorbs water in the porous material.

Additionally, there is provided the toothed conveyor belt type oil recovery device wherein the oil separating liquid is water.

Additionally, there is provided the toothed conveyor belt type oil recovery device wherein the teeth have a front inclination angle of a tooth front surface of 45° or more, and a rear inclination angle of a tooth rear surface of 45° or more.

Additionally, there is provided the toothed conveyor belt type oil recovery device wherein the teeth have a front inclination angle of a tooth front surface and a rear inclination angle of a tooth rear surface which are different from each other.

Additionally, there is provided the toothed conveyor belt type oil recovery device wherein the teeth are 1 mm to 6 mm in height and 1 mm to 6 mm in width.

According to an embodiment of the present disclosure, it is possible to separate the oil recovered by the teeth on one side of the recovery conveyor from the teeth by capillary suction on the other side of the recovery conveyor, thereby preventing oil debris from remaining on the surface of the recovery conveyor, and thus continuously performing the recovery work of oil spilled in water.

Additionally, it is possible to completely separate the oil recovered by the teeth from the teeth by capillary suction, thereby preventing oil that has not been separated from the recovery conveyor and remains on the recovery conveyor from returning to the water.

DETAILED DESCRIPTION

Hereinafter, some embodiments of the present disclosure will be described in detail through the exemplary drawings. It should be noted that in adding the reference signs to the elements of each drawing, like reference signs denote like elements as far as possible even though they are indicated on different drawings. Additionally, in describing the present disclosure; when a certain detailed description of relevant known elements or functions is determined to obscure the subject matter of the present disclosure, the detailed description is omitted.

Furthermore, in describing the elements of the present disclosure, the terms 'first', 'second', A, B, (a), (b), and the like may be used. These terms are only used to distinguish one element from another, and the nature of the corresponding element or its sequence or order is not limited by the term. It should be understood that when an element is referred to as being "connected", "coupled" or "linked" to another element, it may be directly connected or linked to other element, but intervening elements may be "connected", "coupled" or "linked" between each element.

As shown in the drawings, a toothed conveyor belt type oil recovery device according to an embodiment of the present disclosure includes: a recovery conveyor 300 which is wound around a pulley 100 on one side and a pulley 200 on the other side spaced a predetermined distance apart from each other and rotates in such a way that a continuous track rotates, the recovery conveyor 300 having multiple teeth 310 made of a hydrophilic material on the outer surface, the recovery conveyor 300 of which one side is positioned in water W in which oil O is spilled to recover the oil O while feeding the oil O into a space between the adjacent teeth 310 by the rotation; and a separation unit 400 which holds an oil separating liquid L, and is positioned on the other side of the recovery conveyor 300 to separate the oil O from the teeth 310 while the oil separating liquid L is fed into the space between the adjacent teeth 310 by capillary suction when the teeth 310 move on to the oil separating liquid L on the other side of the recovery conveyor 300 by the rotation of the recovery conveyor 300.

Hereinafter, each component of the present disclosure will be described in detail with reference to FIGS. 1 to 11.

The oil recovery device according to the present disclosure recovers the oil O spilled in the water W by the recovery conveyor 300 which is wound around the pulley 100 on one side and the pulley 200 on the other side and rotates in such a way that a continuous track rotates.

Figure 1:
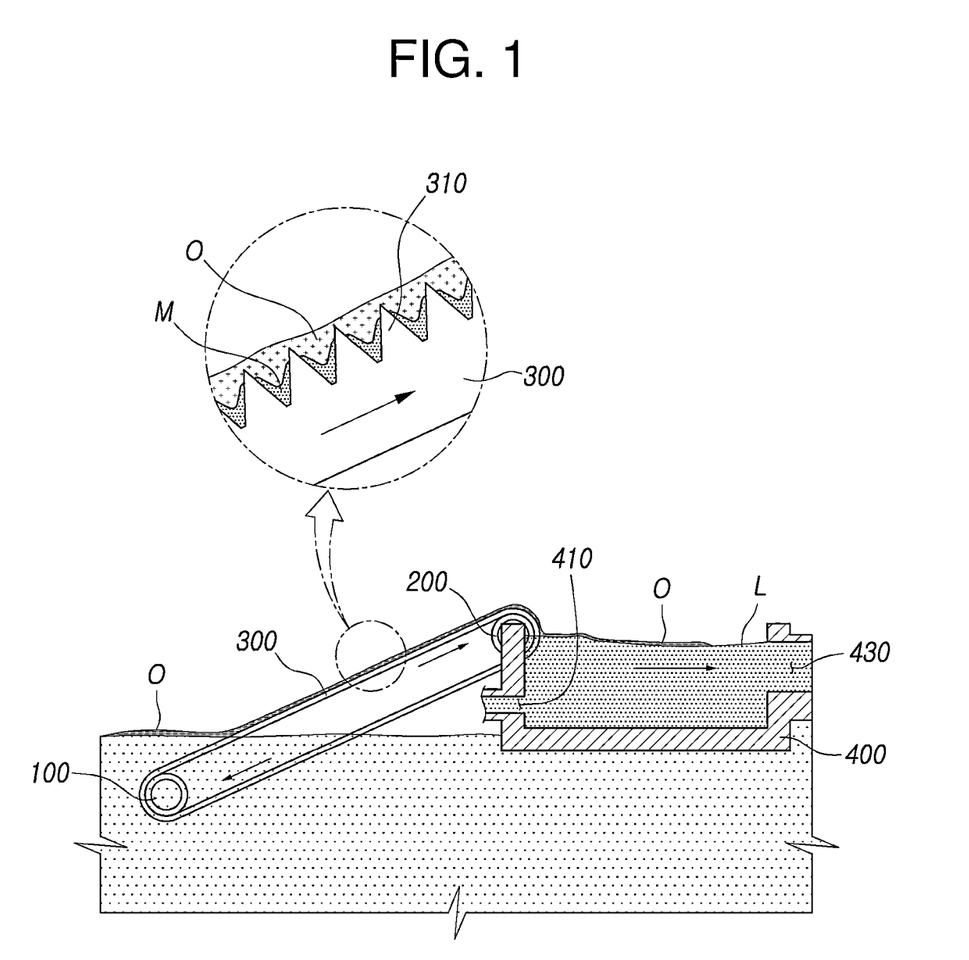
FIG. 1 is a diagram showing the whole configuration of a toothed conveyor belt type oil recovery device according to an embodiment of the present disclosure.

Here, as shown in FIG. 1, the pulley 100 on one side may be positioned in the water W in which the oil O is spilled, and the pulley 200 on the other side may be spaced the predetermined distance apart from the pulley 100 on one side.

At least one of the pulley 100 on one side or the pulley 200 on the other side may be connected to a rotation axis of an external driving means (not shown) to rotate by the power supplied by the driving means, and preferably, the pulley 200 on the other side may be provided such that it is connected to the rotation axis of the driving means and rotates.

In this instance, the driving means may be provided as a power device that supplies the power to the pulley 100 on one side or the pulley 200 on the other side, and for example, the driving means may be provided as an electric motor.

Subsequently, the recovery conveyor 300 is wound around the pulley 100 on one side and the pulley 200 on the other side and rotates in such a way that a continuous track rotates, has the teeth 310 on the outer surface, and is provided to recover the oil O while feeding the oil O into the space between the adjacent teeth 310 by the rotation.

The recovery conveyor 300 is wound around the pulley 100 on one side and the pulley 200 on the other side spaced apart from each other and rotates in such a way that a continuous track rotates, and in this instance, the recovery conveyor 300 may be a few meters long according to the distance between the pulley 100 on one side and the pulley 200 on the other side.

The recovery conveyor 300 is inclined upwards as it goes from one side to the other side, and has one side positioned in the water W in which the oil O is spilled, to recover the oil O spilled in the water W by the rotation.

Figure 3:
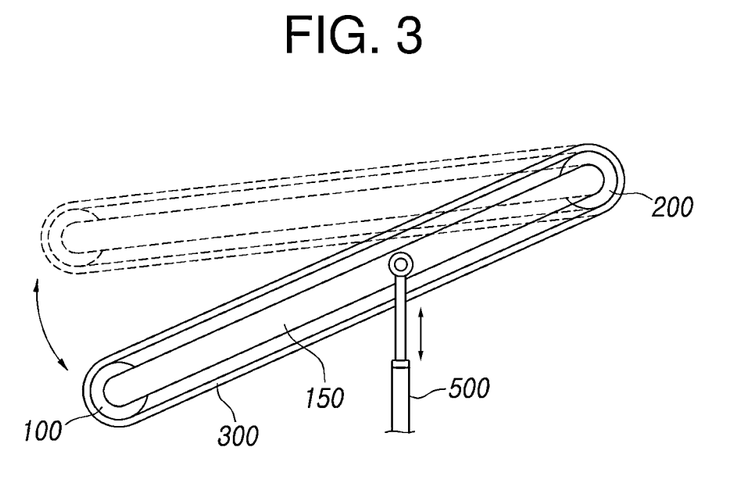
FIG. 3 is a diagram showing a recovery conveyor according to an embodiment of the present disclosure, of which a placement angle is changed by an angle adjustment means.

Meanwhile, as shown in FIG. 3, the oil recovery device according to the present disclosure may further include an angle adjustment means 500 to adjust the placement angle of the recovery conveyor 300, and in this instance, the angle adjustment means 500 may be provided as, for example, a driving device including a piston and a cylinder.

To be more specific, the angle adjustment means 500 may be provided such that the end of the piston rod is rotatably connected to a support 150 which supports the pulley 100 on one side and the pulley 200 on the other side, to adjust the placement angle of the recovery conveyor 300 by the reciprocating motion of the piston.

With the angle adjustment means 500, the placement angle of the recovery conveyor 300 may be adjusted through the angle adjustment means 500 to place one side of the recovery conveyor 300 below the water in which the oil O is spilled at the start of the prevention work for recovering the oil O.

Additionally, the angle of the recovery conveyor 300 may be adjusted through the angle adjustment means 500 to place one side of the recovery conveyor 300 above the water at the end of the prevention work.

Further, with the angle adjustment means 500, the placement angle of the recovery conveyor 300 may be adjusted through the angle adjustment means 500 according to the viscosity of the oil O spilled in the water W during the prevention work for recovering the oil O, and for example, when the viscosity of the oil O spilled in the water W is low, the placement angle of the recovery conveyor 300 may be adjusted through the angle adjustment means 500 to reduce the inclination angle of the recovery conveyor 300.

Meanwhile, the oil recovery device according to the present disclosure may be mounted on the front surface of a ship for recovering the oil O spilled in the water W to recover the oil O spilled in the water W with the movement of the ship.

Subsequently, the recovery conveyor 300 according to the present disclosure has the multiple teeth 310 on the outer surface to recover the oil O spilled in the water W by the teeth 310 by the rotation.

To be more specific, as shown in FIG. the recovery conveyor 300 is provided such that one side is positioned in the water W in which the oil O is spilled, to recover the oil O by the teeth 310 on one side by the rotation in such a way that a continuous track rotates.

Figure 2:
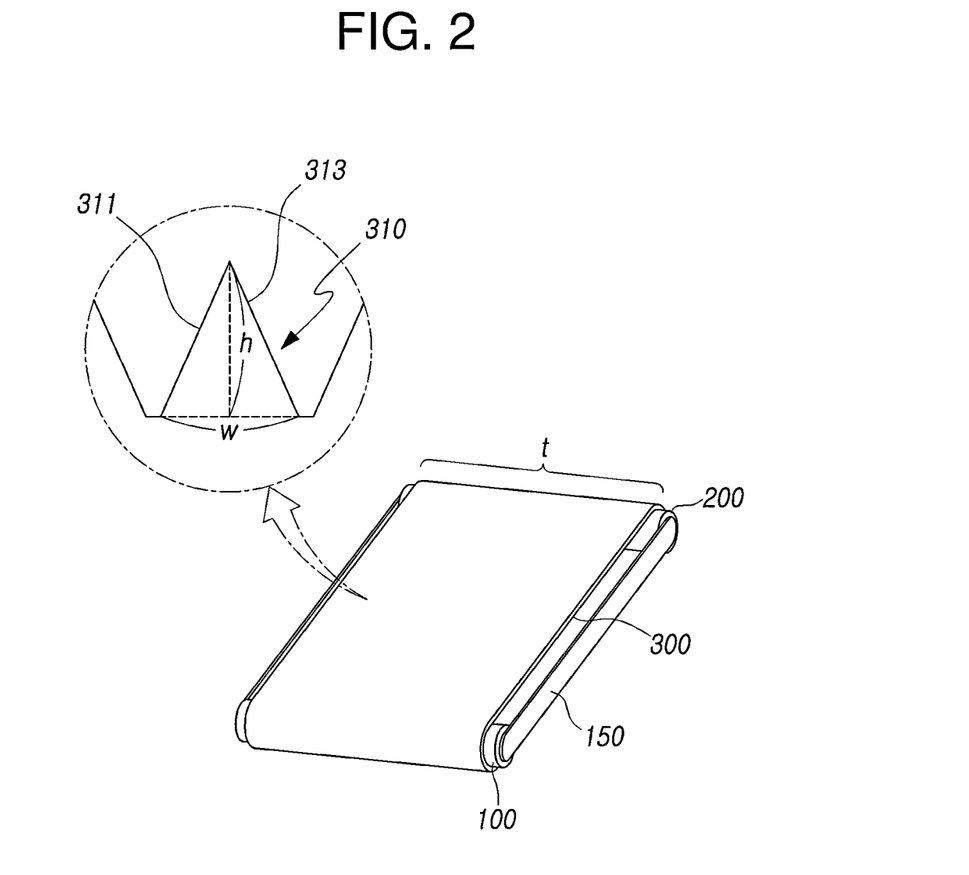
FIG. 2 is a diagram showing a recovery conveyor according to an embodiment of the present disclosure.

Here, as shown in FIG. 2, the teeth 310 according to the present disclosure are formed in the shape of teeth including a tooth front surface 311 and a tooth rear surface 313 and having a predetermined height h and width w, and in particular, the teeth 310 are made of a hydrophilic or superhydrophilic material.

Figure 7:
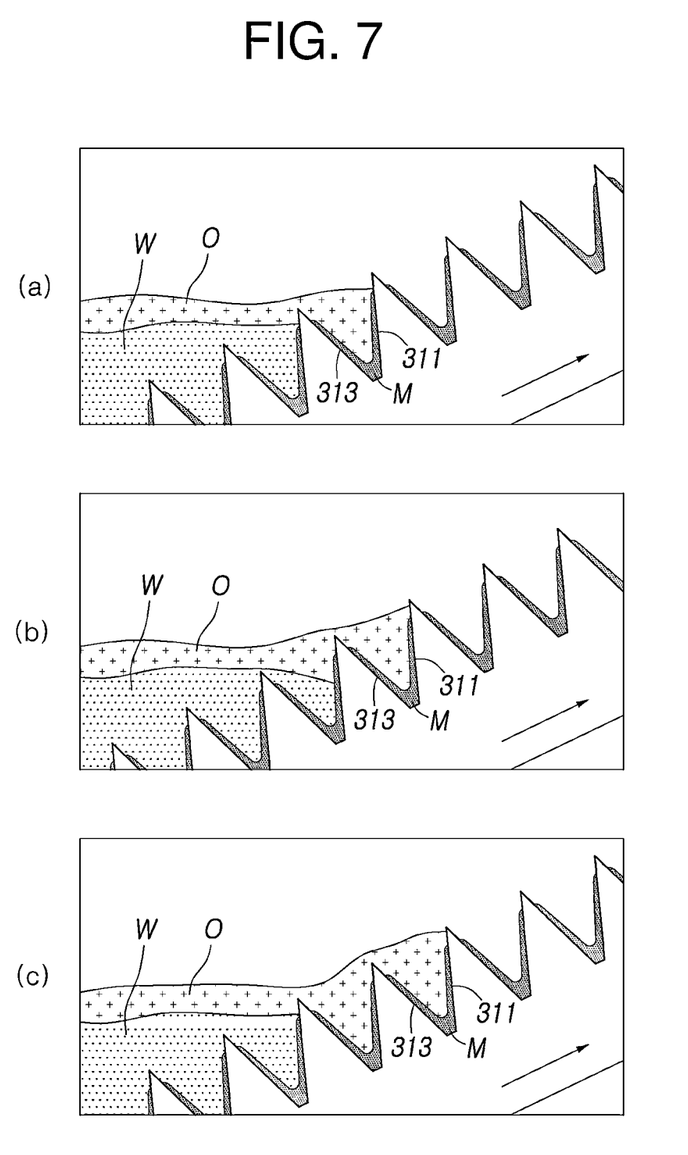
FIG. 7 is a diagram showing a process of recovering oil from water by teeth according to an embodiment of the present disclosure.

The recovery conveyor 300 has one side positioned in the water W in which the oil O is spilled, and as shown in FIG. 7, the recovery conveyor 300 recovers the oil O spilled in the water W while feeding the oil O into the space between the adjacent teeth 310 by the rotation from one side to the other side in such a way that a continuous track rotates.

In this instance, when the teeth 310 are made of a hydrophilic or superhydrophilic material, a membrane M may be formed on the tooth front surface 311 and the tooth rear surface 313 of the teeth 310, and accordingly the oil O is recovered in a state that the oil O is not directly attached to the surface of the teeth 310 (the oil O is only attached to the tip of the teeth 310), and since the oil O is recovery in a state that the oil O is not directly attached to the surface of the teeth 310, it is very easy to separate the oil O from the teeth 310 afterwards.

Meanwhile, the oil O recovered by the teeth 310 moves from one side of the recovery conveyor 300 to the other side by the rotation of the recovery conveyor 300.

The oil O moving to the other side of the recovery conveyor 300 is separated from the teeth 310 by the separation unit 400 provided on the other side of the recovery conveyor 300, and finally is recovered, and it will be described in detail below.

Subsequently, the separation unit 400 holds the oil separating liquid L and is positioned on the other side of the recovery conveyor 300, to separate the oil O from the teeth 310 while the oil separating liquid L is fed into the space between the adjacent teeth 310 by capillary suction when the teeth 310 move from the other side of the recovery conveyor 300 on to the oil separating liquid L by the rotation of the recovery conveyor 300.

As shown in FIG. 1, the separation unit 400 according to the present disclosure is positioned on the other side of the recovery conveyor 300 to separate the oil O from the recovery conveyor 300, the oil O moving from one side of the recovery conveyor 300 to the other side by the rotation of the recovery conveyor 300 in such a way that a continuous track rotates.

To be more specific, the separation unit 400 is positioned adjacent to the pulley 200 on the other side, so the teeth 310 of the recovery conveyor 300 moving along the outer peripheral surface of the pulley 200 on the other side moves into the oil separating liquid L contained in the separation unit 400 by the rotation in such a way that a continuous track rotates.

As described above, the teeth 310 move into the oil separating liquid L contained in the separation unit 400 on the other side of the recovery conveyor 300 by the rotation of the recovery conveyor 300, and in this instance, the recovered oil O in the teeth 310 is separated from the teeth 310 by the oil separating liquid L.

In further detail, the oil O recovered by the teeth 310 is separated from the teeth 310 while the oil separating liquid L is fed into the space between the adjacent teeth 310 by capillary suction when the teeth 310 move on to the oil separating liquid L on the other side of the recovery conveyor 300 by the rotation of the recovery conveyor 300.

Figure 8:
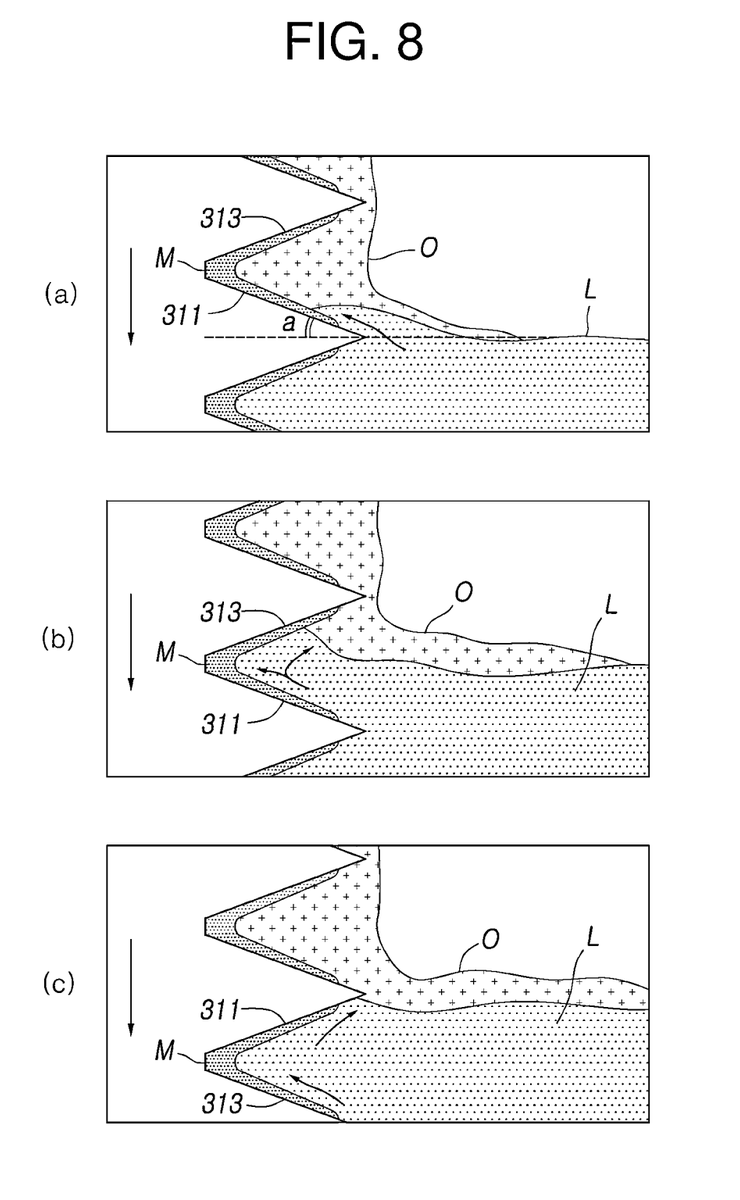
FIG. 8 is a diagram showing a process of separating oil from teeth according to an embodiment of the present disclosure.

Describing the separation process of the oil O with reference to FIG. 8, when the teeth 310 move into the oil separating liquid L contained in the separation unit 400 by the rotation of the recovery conveyor 300 (FIG. 8(A)), the oil separating liquid L is rapidly fed into the space between the adjacent teeth 310 by capillary suction and pushes the recovered oil O in the space between the teeth 310 (FIG. 8(B)), and as the oil separating liquid L is continuously fed into the space between the teeth 310, finally, the oil O is separated from the teeth 310 (FIG. 8(C)).

Figure 9:
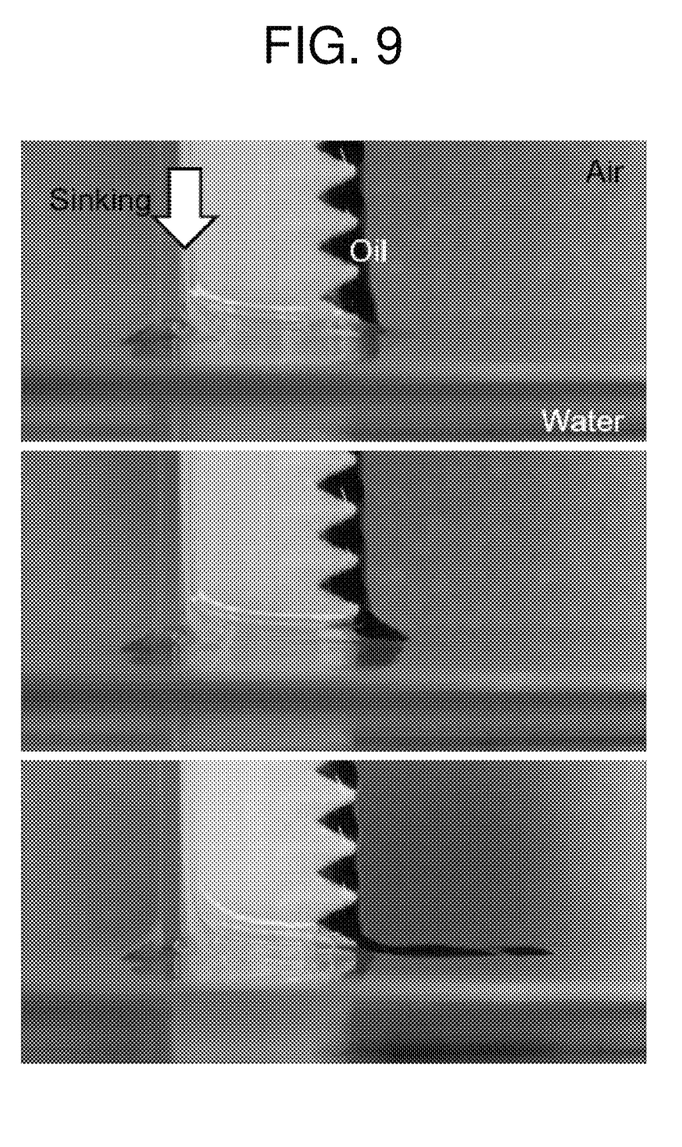
FIG. 9 is a photographic image showing the separation of oil from teeth according to an embodiment of the present disclosure.

Meanwhile, FIG. 9 shows the actual separation of the oil O from the teeth 310 by capillary suction with the movement of the teeth 310 into the oil separating liquid L.

Figure 10:
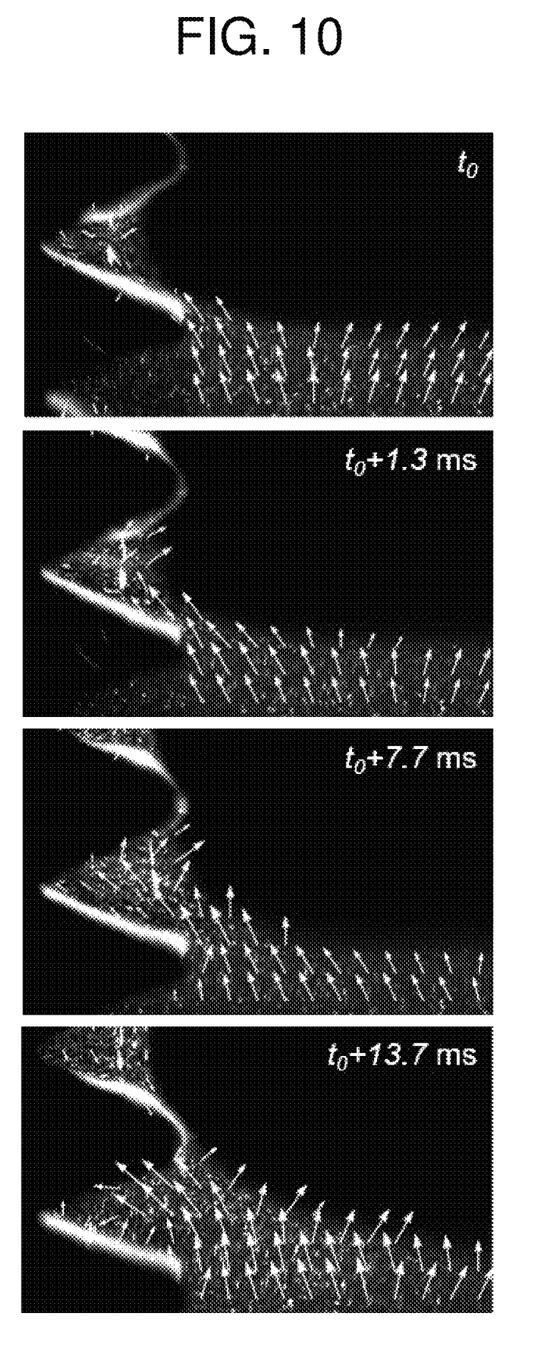
FIG. 10 is a photographic image showing a vector field representation of a flow of an oil separating liquid into teeth according to an embodiment of the present disclosure by capillary suction in a PIV test.
Figure 11:
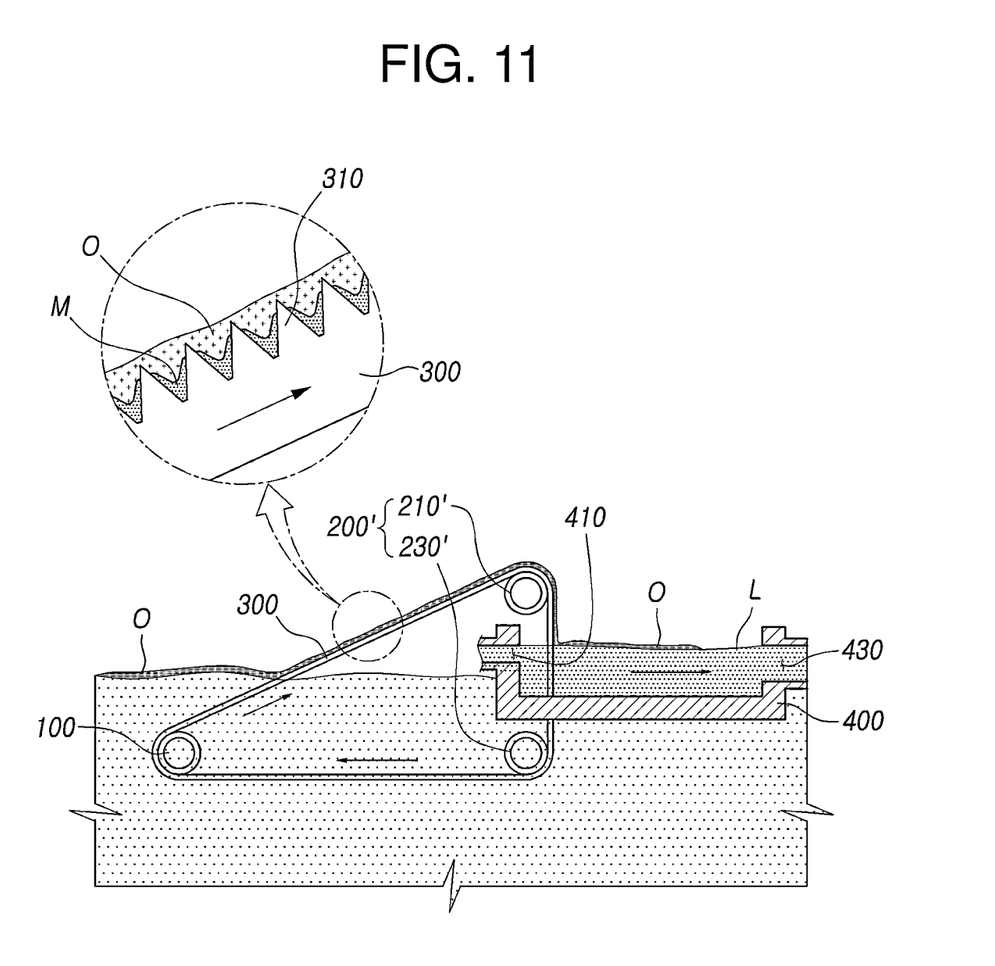
FIG. 11 is a diagram showing the whole configuration of a toothed conveyor belt type oil recovery device according to another embodiment of the present disclosure.

Meanwhile, FIG. 10 shows relative velocity vector fields according to the Particle Image Velocimetry (PILI) test results on the separation of the oil O from the teeth 310 when the teeth 310 move into the oil separating liquid L.

Referring to FIG. 10, it can be seen that when the teeth 310 move into the oil separating liquid L, a strong flow is formed near the space between the teeth 310 by capillary suction, and by the flow, the oil O is separated from the teeth 310 while the oil separating liquid L is fed into the space between the adjacent teeth 310.

Meanwhile, as shown in FIG. 1, the separation unit 400 according to the present disclosure is positioned on the other side of the recovery conveyor 300, and may be provided in the form of, for example, a water tank to hold the oil separating liquid L.

In this instance, the separation unit 400 may have, on one side, a liquid inlet 410 through which the oil separating liquid L enters, and on the other side, a liquid outlet 430 through which the oil separating liquid L exits.

The separation unit 400 may be provided to allow the oil separating liquid L to enter the liquid inlet 410 on one side and exit the liquid outlet 430 on the other side by an external pump (not shown), to cause the oil separating liquid L to circulate within the separation unit 400.

Accordingly, the oil O separated from the teeth 310 may exit the liquid outlet 430 together with the oil separating liquid L circulating within the separation unit 400, and the oil coming out of the liquid outlet 430 may be stored in an oil recovery tank (not shown) provided adjacent to the separation unit 400.

Meanwhile, as shown in FIG. 9, the oil recovery device according to another embodiment of the present disclosure may include the pulley 200' on the other side spaced a predetermined distance apart from the pulley 100 on one side, the pulley 200' including a first pulley 210' and a second pulley 230' disposed at upper and lower positions on the other side.

That is, in the case of the oil recovery device according to another embodiment of the present disclosure, the recovery conveyor 300 is wound around the pulley 100 on one side and the first pulley 210' and the second pulley 230' on the other side and rotates in such a way that a continuous track rotates.

In this case, the separation unit 400 is positioned on the other side of the recovery conveyor 300, and may be positioned between the first pulley 210' and the second pulley 230' on the other side, and the teeth 310 of the recovery conveyor 300 moving from the first pulley 210' to the second pulley 230' on the other side by the rotation in such a way that a continuous track rotates separate the oil O while they pass through the oil separating liquid L contained in the separation unit 400.

As described above, the oil recovery device according to the present disclosure includes the multiple teeth 310 on the outer surface of the recovery conveyor 300 and is configured to recover the oil O spilled in the water W by the teeth 310 on one side and separate the oil O from the teeth 310 by the separation unit 400 on the other side, and then allow the oil O to exit the liquid outlet 430 of the separation unit 400.

That is, the oil recovery device according to the present disclosure performs recovery of the oil O on one side of the recovery conveyor 300 and separation of the oil O on the other side, and in this instance, the performance of the oil recovery function on one side of the recovery conveyor 300 and the oil separation function on the other side of the recovery conveyor 300 may be improved by varying the material, shape and size of the teeth 310 formed on the outer surface of the recovery conveyor 300.

Hereinafter, various embodiments of the teeth 310 for improving the performance of the oil recovery function and the oil separation function of the oil recovery device will be described.

First, the teeth 310 may be made of a hydrophilic material as described above, and in this instance, the oil separating liquid L may be water.

When the teeth 310 are made of a hydrophilic material and the oil separating liquid L is water, the capillary suction occurring between the teeth 310 and the oil separating liquid L may be maximized, and accordingly it may be easier to separate the oil O from the teeth 310.

Additionally, when the teeth 310 are made of a hydrophilic material, it is possible to prevent the recovered oil O in the teeth 310 from coming into direct contact with and attaching to the surface of the teeth 310 by the water, which makes it easier to separate the oil O from the teeth 310.

Meanwhile, the teeth 310 may be made of a porous material which absorbs water in the porous material, and when the teeth 310 are made a porous material which absorbs water in the porous material, the surface of the teeth 310 may be kept in water-wet state.

To be more specific, the teeth 310 may be made of a porous material containing micro pores, and in this instance, the pore may be 10 μm to 100 μm in size.

When the surface of the teeth 310 gets wet in water, it is possible to prevent the recovered oil O in the teeth 310 from coming into direct contact with and attaching to the surface of the teeth 310 by the water, and accordingly it may be easier to separate the oil O from the teeth 310.

Meanwhile, the teeth 310 according to an embodiment of the present disclosure may have a nanostructure on the surface to improve hydrophilicity.

Here, the nanostructure may be at least one type selected from the group consisting of a nano-hair, a nanofiber, a nano-pillar, a nano-rod and a nano-wire.

Additionally, the nanostructure may be 1 μm or more in height and 2 μm or less in width, and the spacing between nanostructures may be 2 μm or less.

Figure 6:
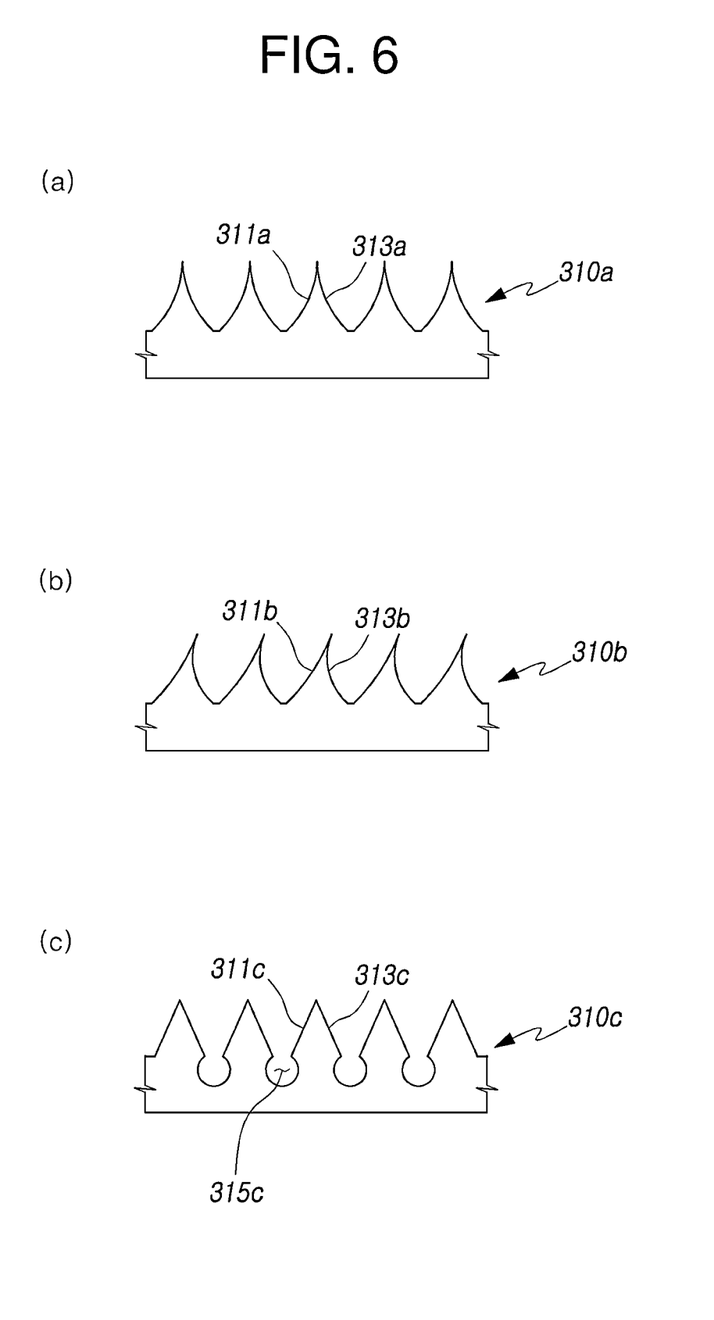
FIG. 6 is an enlarged diagram of teeth according various embodiments of the present disclosure.

When the nanostructure is formed on the surface of the teeth 310, the membrane M may be formed on the surface of the teeth 310 by the improved hydrophilicity (superhydrophilicity) of the teeth 310 as shown in FIG. 6, and accordingly it is possible to minimize the contact surface between the teeth 310 and the oil O, and eventually, separate the oil O from the teeth 310 more easily.

Figure 4:
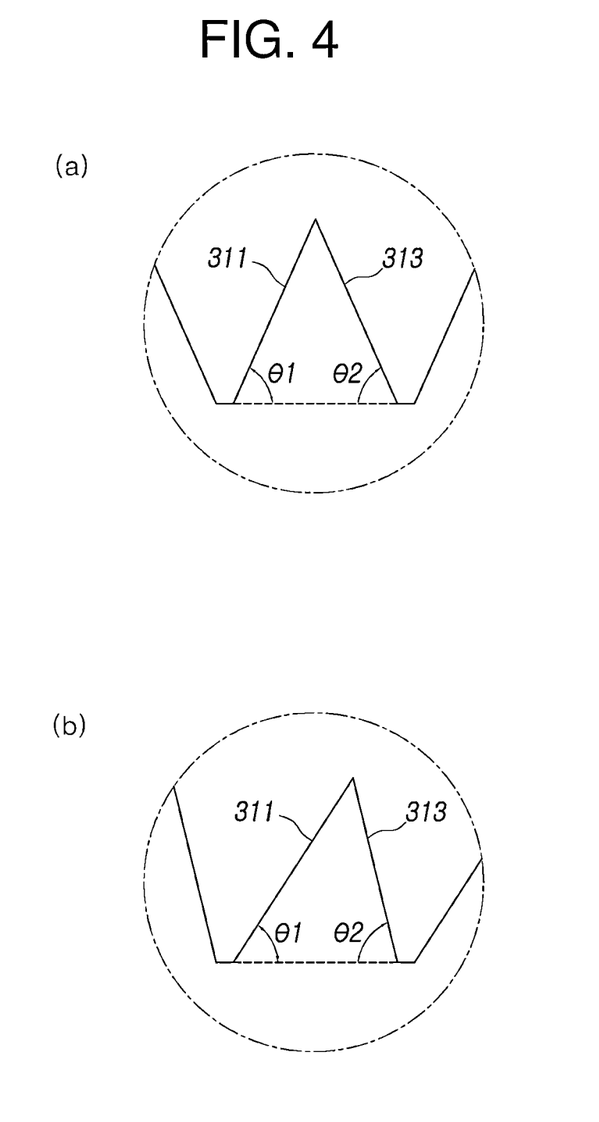
FIG. 4 is an enlarged diagram of a tooth according to an embodiment of the present disclosure.

Subsequently, the teeth 310 according to an embodiment of the present disclosure have a front inclination angle θ1 of the tooth front surface 311 of 45° or more and a rear inclination angle θ2 of the tooth rear surface 313 of 45° or more as shown in FIG. 4.

Figure 5:
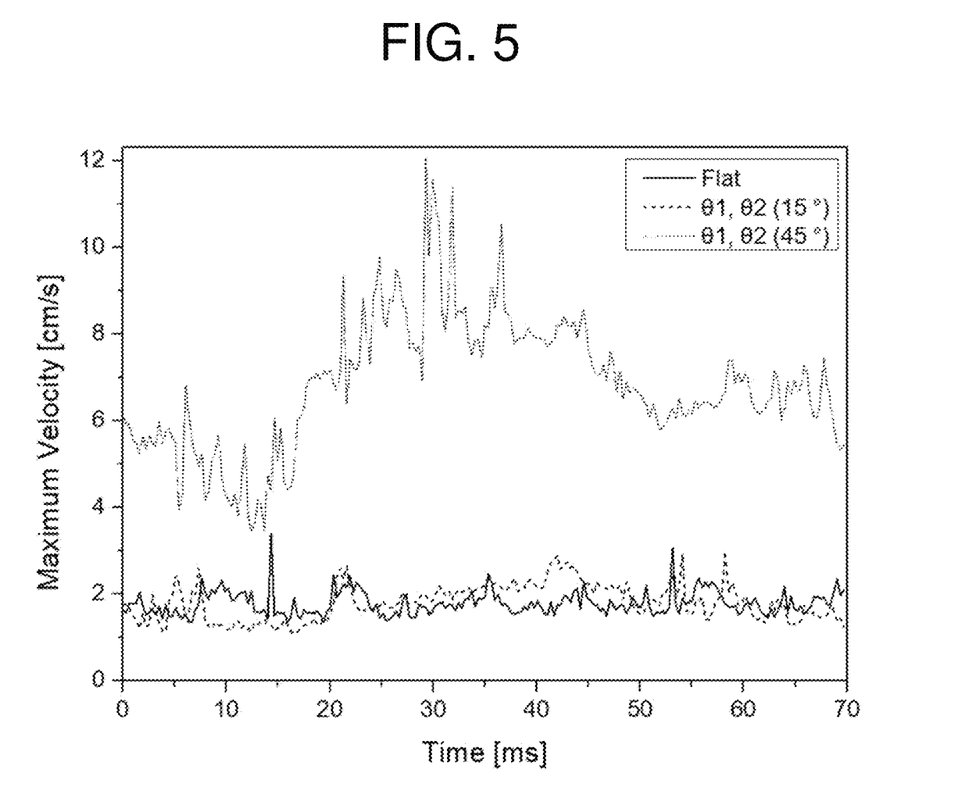
FIG. 5 is a graph showing the maximum velocity of a flow formed near teeth according to an embodiment of the present disclosure when the teeth move into an oil separating liquid in a Particle Image Velocimetry (Ply) test.

FIG. 5 shows the PIV test results when the teeth 310 move into the oil separating liquid L.

The graph of FIG. 5 shows the maximum velocity of the flow formed near the space between the adjacent teeth 310 by capillary suction when the teeth 310 move into the oil separating liquid L, and as shown in the graph of FIG. 5, it can be seen that when there is no teeth 310, or each of the front inclination angle θ1 and the rear inclination angle θ2 of the teeth 310 is 15°, a strong flow is not formed near the space between the adjacent teeth 310.

When a strong flow is not formed near the space between the adjacent teeth 310, it is impossible to effectively separate the oil O from the teeth 310.

Accordingly, the teeth 310 according to an embodiment of the present disclosure have the front inclination angle θ1 of 45° or more and the rear inclination angle θ2 of 45° or more.

Subsequently, as shown in FIG. 4, the teeth 310 may have the front inclination angle θ1 of the tooth front surface 311 and the rear inclination angle θ2 of the tooth rear surface 313 which are different from each other.

As shown in FIG. 4(A), the teeth 310 according to the present disclosure may have the tooth front surface 311 and the tooth rear surface 313 in symmetry such that the front inclination angle θ1 of the tooth front surface 311 and the rear inclination angle θ2 of the tooth rear surface 313 are equal, and as shown in FIG. 4(B), may have the tooth front surface 311 and the tooth rear surface 313 in asymmetry such that the front inclination angle θ1 of the tooth front surface 311 and the rear inclination angle θ2 of the tooth rear surface 313 are different from each other.

In this instance, the front inclination angle θ1 of the tooth front surface 311 may be 45° to 75°, and the rear inclination angle θ2 of the tooth rear surface 313 may be 45° to 75°.

For example, the teeth 310 may have the tooth front surface 311 and the tooth rear surface 313 in symmetry such that each of the front inclination angle θ1 of the tooth front surface 311 and the rear inclination angle θ2 of the tooth rear surface 313 is 45°.

Here, when the tooth front surface 311 and the tooth rear surface 313 are formed in asymmetry such that the front inclination angle θ1 of the tooth front surface 311 and the rear inclination angle θ2 of the tooth rear surface 313 are different from each other, it is possible to improve the performance of the oil recovery function and the oil separation function of the recovery conveyor 300.

For example, the teeth 310 may have the rear inclination angle θ2 of the tooth rear surface 313 which is higher than the front inclination angle θ1 of the tooth front surface 311, and particularly, the front inclination angle θ1 of the tooth front surface 311 may be 45°, and the rear inclination angle θ2 of the tooth rear surface 313 may be 75°.

In this case, since the rear inclination angle θ2 of the tooth rear surface 313 is steeper, it may be easier to recover the oil O by the teeth 310 on one side of the recovery conveyor 300.

In another example, the teeth 310 may have the front inclination angle θ1 of the tooth front surface 311 which is higher than the rear inclination angle θ2 of the tooth rear surface 313, and particularly, the front inclination angle θ1 of the tooth front surface 311 may be 75°, and the rear inclination angle θ2 of the tooth rear surface 313 may be 45°.

In this case, the capillary suction of the oil separating liquid L starting from the tooth front surface 311 may occur more easily by a smaller angle a between the tooth front surface 311 and the surface of the oil separating liquid L on the other side of the recovery conveyor 300.

As described above, it is possible to improve the performance of the oil recovery function and the oil separation function of the recovery conveyor 300 by making the front inclination angle θ1 of the tooth front surface 311 and the rear inclination angle θ2 of the tooth rear surface 313 equal or different.

Subsequently, as shown in FIG. 6(A), the teeth 310a according to another embodiment of the present disclosure may have at least one of the tooth front surface 311a or the tooth rear surface 313a in the shape of a curved surface.

That is, the teeth 310 may have the tooth front surface 311 and the tooth rear surface 313 in flat shape as shown in FIG. 4, while the teeth 310 may have the tooth front surface 311 and the tooth rear surface 313 in the shape of a curved surface as shown in FIG. 6(A).

For example, as shown in FIG. 6(A), the teeth 310a may have the tooth front surface 311a and the tooth rear surface 313a in the shape of a curved surface which curves inwards, but is not necessarily limited thereto, and the teeth 310a may have any one of the tooth front surface 311a and the tooth rear surface 313a in the shape of a curved surface.

As described above, when the teeth 310a of the present disclosure are made of a hydrophilic material, as shown in FIGS. 7 and 8, the oil O recovered by the teeth 310a generally contacts the surface of the end of the teeth 310a and does not directly contact other areas than the end by hydrophilicity.

Accordingly, when the tooth front surface 311a and the tooth rear surface 313a are formed in the shape of a curved surface, it is possible to minimize the contact surface with the oil O at the end of the teeth 310a, thereby separating the oil O from the teeth 310a more easily.

Meanwhile, as shown in FIG. 6(B), the teeth 310b according to still another embodiment of the present disclosure may have the tooth front surface 311b and the tooth rear surface 313b in the shape of a curved surface which curves inwards, wherein the radius of curvature of the tooth front surface 311b is different from the radius of curvature of the tooth rear surface 313b.

To be more specific, the teeth 310b according to still another embodiment of the present disclosure may have the tooth front surface 311b and the tooth rear surface 313b in the shape of a curved surface which curves inwards, wherein the radius of curvature of the tooth front surface 311b is larger than the radius of curvature of the tooth rear surface 313b.

When the radius of curvature of the tooth front surface 311b is larger than the radius of curvature of the tooth rear surface 313b, it is possible to perform the recovery of the oil O by the teeth 310b on one side of the recovery conveyor 300 more easily, and cause the capillary suction of the oil separating liquid L on the other side of the recovery conveyor 300 more easily.

In the case of the tooth front surface 311b, as the radius of curvature is larger, the slope of the tooth front surface 311b on the other side of the recovery conveyor 300 is smaller, and thus the capillary suction of the oil separating liquid L may occur more easily.

Additionally, in the case of the tooth rear surface 313b, as the radius of curvature is smaller, the oil O does not flow down from the tooth rear surface 313b again during the recovery of the oil O on one side of the recovery conveyor 300.

Subsequently, as shown in FIG. 5(C), the teeth 310c according to further another embodiment of the present disclosure may have a liquid accommodating groove 315c in the space between the adjacent teeth 310c.

A predetermined liquid may be fed into the liquid accommodating groove 315c formed in the space between the teeth 310c, and the contact surface between the teeth 310c and the oil O may be minimized by the liquid fed into the liquid accommodating groove 315c, thereby separating the oil O from the teeth 310a more easily.

Here, the liquid fed into the liquid accommodating groove 315c may be water from the water W on one side of the recovery conveyor 300 and the oil separating liquid L from the separation unit 400.

Subsequently, the teeth 310 according to an embodiment of the present disclosure have the height h of 1 mm to 6 mm and the width w of 1 mm to 6 mm.

Here, the height h and the width w of the teeth 310 may be shown in FIG. 2.

When the height h and the width w of the teeth 310 are too large, the area in which capillary suction occurs is so locally formed compared to the size of the teeth 310, thereby failing to smoothly separate the oil O from the teeth 310.

On the contrary, when the height h and the width w of the teeth 310 are too small, it is difficult that the capillary suction and the consequential separation of the oil O separately occur.

Accordingly, the teeth 310 according to an embodiment of the present disclosure may have the height h of 1 mm to 6 mm and the width w of 1 mm to 6 mm, taking the capillary length (=2.7 mm) of water into account.

Here, the teeth 310 according to an embodiment of the present disclosure may have the thickness t of 3 mm or more, and when the thickness t of the teeth 310 is smaller than 3 mm, the capillary suction from the end of the teeth 310 to the bottom between the teeth 310 may not work smoothly by another capillary action in the thickness-wise direction of the teeth 310.

As described above, according to an embodiment of the present disclosure, it is possible to separate oil recovered by the teeth on one side of the recovery conveyor from the teeth by capillary suction on the other side of the recovery conveyor, thereby preventing oil debris from remaining on the surface of the recovery conveyor, and thus continuously performing the recovery work of oil spilled in water.

Additionally, it is possible to completely separate oil recovered by the teeth from the teeth by capillary suction, thereby preventing oil that has not been separated from the recovery conveyor and remains on the recovery conveyor from returning to the water.

Although the foregoing describes that all the elements constituting the embodiment of the present disclosure are combined into one or work in combination, the present disclosure is not necessarily limited to the disclosed embodiment. That is, the elements may be selectively combined into at least one and work in combination within the intended scope of the present disclosure.

The foregoing description is provided to describe the technical spirit of the present disclosure for illustrative purposes only, and it is obvious to those having ordinary skill in the technical field pertaining to the present disclosure that various changes and modifications may be made thereto without departing from the essential features of the present disclosure. Therefore, the embodiments disclosed herein is for the purpose of describing the technical spirit of the present disclosure, and is not intended to be limiting of this disclosure, and the scope of technical spirit of the present disclosure is not limited by these embodiments. The scope of protection of the present disclosure should be interpreted by the appended claims, and the full technical spirit within its equivalent scope should be interpreted as falling within the scope of protection of the present disclosure.

DETAILED DESCRIPTION OF MAIN ELEMENTS

100: Pulley on one side
150: Support
200: Pulley on the other side
300: Recovery conveyor
310: Teeth
400: Separation unit
410: Liquid inlet
430: Liquid outlet
500: Angle adjustment device

What is claimed is:

1. A toothed conveyor belt type oil recovery device, comprising:
   a recovery conveyor which is wound around a pulley on one side and a pulley on a other side spaced a predetermined distance apart from each other and rotates in such a way that a continuous track rotates, the recovery conveyor having multiple teeth made of a hydrophilic material on an outer surface, the recovery conveyor having one side positioned in water in which oil is spilled to recover the oil while feeding the oil into a space between adjacent teeth of the multiple teeth by the rotation; and
   a separation unit which holds an oil separating liquid, and is positioned on the other side of the recovery conveyor to separate the oil from the teeth while the oil separating liquid is fed into the space between the adjacent teeth by capillary suction when the teeth move on to the oil separating liquid on the other side of the recovery conveyor by the rotation of the recovery conveyor.

2. The toothed conveyor belt type oil recovery device according to claim 1, wherein the teeth have a nanostructure on a surface thereof, the nanostructure being of at least one type selected from the group consisting of a nano-hair, a nanofiber, a nano-pillar, a nano-rod and a nano-wire.

3. The toothed conveyor belt type oil recovery device according to claim 1, wherein the teeth are made of a porous material which absorbs water in the porous material.

4. The toothed conveyor belt type oil recovery device according to claim 1, wherein the oil separating liquid is water.

5. The toothed conveyor belt type oil recovery device according to claim 1, wherein each of the multiple teeth have a front inclination angle of a tooth front surface of 45° or more, and a rear inclination angle of a tooth rear surface of 45° or more.

6. The toothed conveyor belt type oil recovery device according to claim 1, wherein each of the multiple teeth have a front inclination angle of a tooth front surface and a rear inclination angle of a tooth rear surface which are different from each other.

7. The toothed conveyor belt type oil recovery device according to claim 1, wherein each of the multiple teeth are 1 mm to 6 mm in height and 1 mm to 6 mm in width.

* * * * *